United States Patent
Colon-Bonet

(12) 
(10) Patent No.: US 6,285,300 B1
(45) Date of Patent: Sep. 4, 2001

(54) APPARATUS AND METHOD FOR REDUCING POWER AND NOISE THROUGH REDUCED SWITCHING RECORDING IN LOGIC DEVICES

(75) Inventor: Glenn T Colon-Bonet, Ft Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/501,044

(22) Filed: Feb. 9, 2000

(51) Int. Cl.[7] .................................................... H03M 5/00
(52) U.S. Cl. ................... 341/50; 341/82; 326/98
(58) Field of Search .................. 341/50, 82; 326/95, 326/98

(56) References Cited

U.S. PATENT DOCUMENTS

| | | | |
|---|---|---|---|
| 4,984,202 * | 1/1991 | Kawahara et al. | 365/177 |
| 5,389,835 * | 2/1995 | Yetter | 326/98 |
| 5,706,323 * | 1/1998 | Miller | 377/73 |
| 6,021,434 * | 2/2000 | Chu | 708/630 |
| 6,066,965 * | 5/2000 | Blomgren et al. | 326/95 |

* cited by examiner

Primary Examiner—Howard L. Williams

(57) ABSTRACT

An apparatus and method provide an apparatus and method for reducing noise production and power consumption in a logic device that uses traditional domino encoded signals. In particular, the apparatus is accomplished by a recode circuitry that receives and recodes a traditional domino encoded signal received from a first logic circuit in the logic device, into a reduced switching signal. The recode circuitry sends the reduced switching signal to a second logic circuit. A decode circuitry receives and decodes the reduced switching signal back into a traditional domino encoded signal. The decode circuitry then sends the traditional domino encoded signal to a second logic circuit in the logic device. The method is accomplished by receiving a traditional domino encoded signal from a first logic circuit. The traditional domino encoded signal is converted into a reduced switching signal and transmitted. The reduced switching signal is received and converted back into the traditional domino encoded signal.

15 Claims, 10 Drawing Sheets

| | | NEW ENCODING | | | | 30 |
|---|---|---|---|---|---|---|
| OPERAND MULTIPLES | | +2X 35 | +1X 34 | 0 33 | -1X 32 | -2X 31 |
| +0 | | 0 | 0 | 1 | 0 | 0 |
| +1X | | 0 | 1 | 0 | 0 | 0 |
| +1X | | 0 | 1 | 0 | 0 | 0 |
| +2X | | 1 | 0 | 0 | 0 | 0 |
| +2X | | 0 | 0 | 0 | 0 | 1 |
| -1X | | 0 | 0 | 0 | 1 | 0 |
| -1X | | 0 | 0 | 0 | 1 | 0 |
| -0 | | 0 | 0 | 1 | 0 | 0 |

| RADIX 4 | |
|---|---|
| MULTIPLIER BITS | OPERAND MULTIPLES |
| Y(I+1)  Y(I)  Y(I-1) | |
| 0   0   0 | +0 |
| 0   0   1 | +1X |
| 0   1   0 | +1X |
| 0   1   1 | +2X |
| 1   0   0 | -2X |
| 1   0   1 | -1X |
| 1   1   0 | -1X |
| 1   1   1 | -0 |

| TRADITIONAL DOMINO ENCODING | | | | | |
|---|---|---|---|---|---|
| OPERAND MULTIPLES | SIGN HIGH | SIGN LOW | 0X | 1X | 2X |
| +0 | 0 | 1 | 1 | 0 | 0 |
| +1X | 0 | 1 | 0 | 1 | 0 |
| +1X | 0 | 1 | 0 | 1 | 0 |
| +2X | 0 | 1 | 0 | 0 | 1 |
| +2X | 1 | 0 | 0 | 0 | 1 |
| -1X | 1 | 0 | 0 | 1 | 0 |
| -1X | 1 | 0 | 0 | 1 | 0 |
| -0 | 1 | 0 | 1 | 0 | 0 |

NEW ENCODING — 30

| OPERAND MULTIPLES | +2X 35 | +1X 34 | 0 33 | -1X 32 | -2X 31 |
|---|---|---|---|---|---|
| +0 | 0 | 0 | 1 | 0 | 0 |
| +1X | 0 | 1 | 0 | 0 | 0 |
| +1X | 0 | 1 | 0 | 0 | 0 |
| +2X | 1 | 0 | 0 | 0 | 0 |
| +2X | 0 | 0 | 0 | 0 | 1 |
| -1X | 0 | 0 | 0 | 1 | 0 |
| -1X | 0 | 0 | 0 | 1 | 0 |
| -0 | 0 | 0 | 1 | 0 | 0 |

FIG. 5A
| LOGICAL VALUES | | MOUSETRAP ENCODING | | | | PKG RECODING | | | ACTION |
|---|---|---|---|---|---|---|---|---|---|
| SUM | CARRY | SH 71 | SL 72 | CH 73 | CL 74 | P 76 | K 77 | G 78 | |
| - | - | 0 | 0 | 0 | 0 | 0 | 0 | 0 | PRECHARGE/NOT READY |
| 0 | 0 | 0 | 1 | 0 | 1 | 0 | 1 | 0 | KILL- CLEAR ALL BITS |
| 0 | 1 | 0 | 1 | 1 | 0 | 1 | 0 | 0 | PROPAGATE - SET 1 BIT |
| 1 | 0 | 1 | 0 | 0 | 1 | 1 | 0 | 0 | PROPAGATE - SET 1 BIT |
| 1 | 1 | 1 | 0 | 1 | 0 | 0 | 0 | 1 | GENERATE - SET 2 BITS |
FIG. 5B
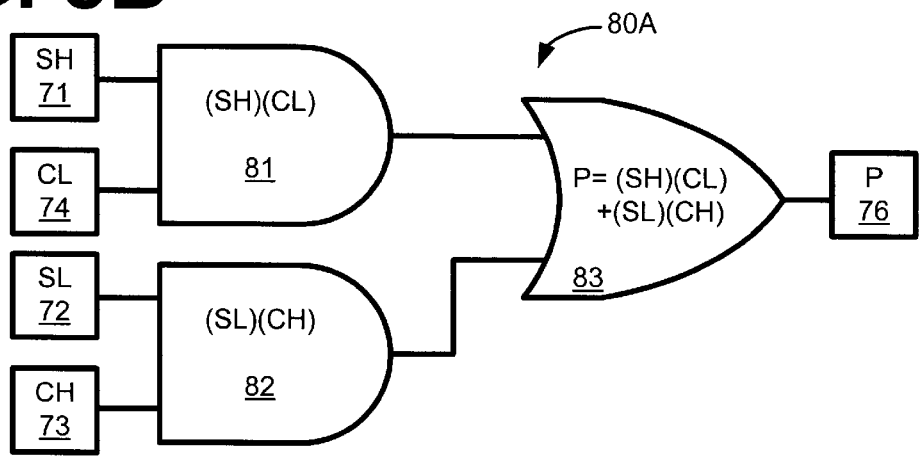
FIG. 5C
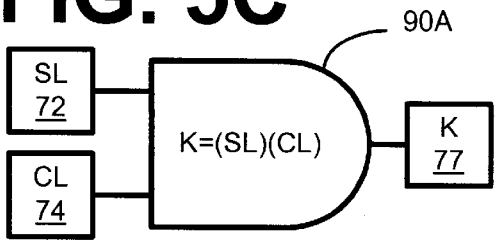
FIG. 5D
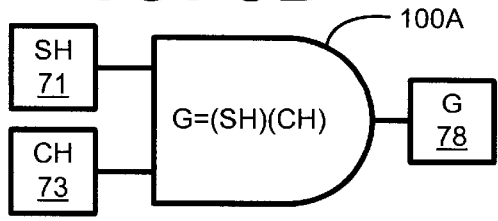

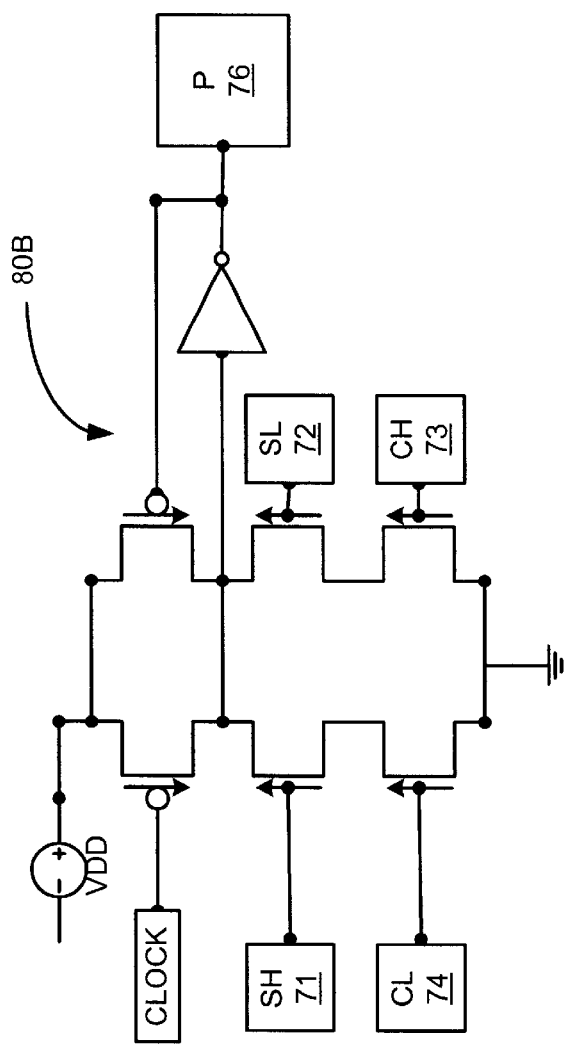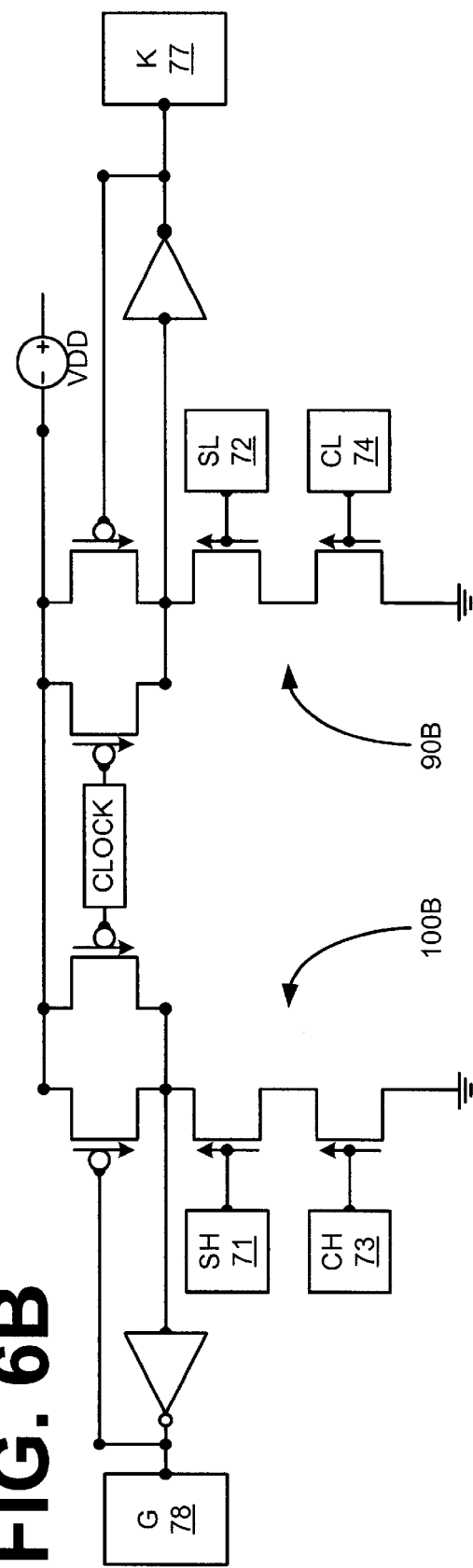
FIG. 6A
FIG. 6B

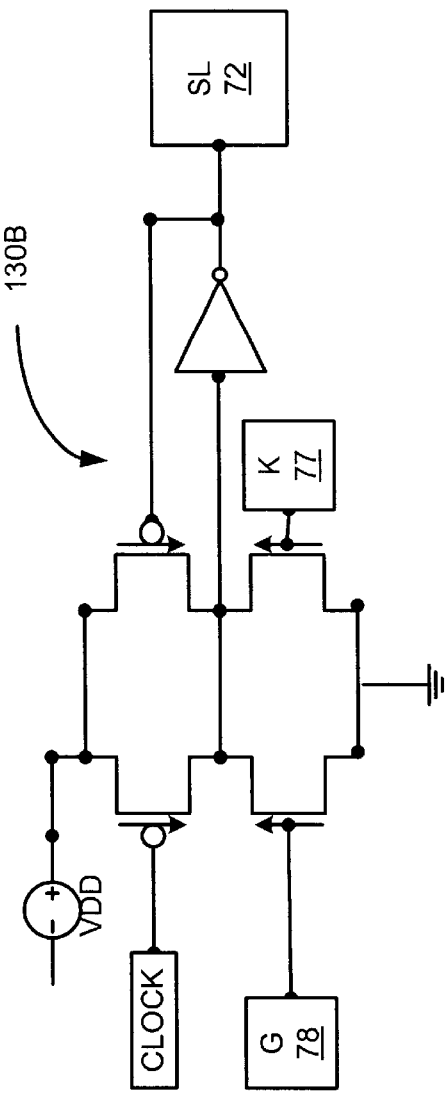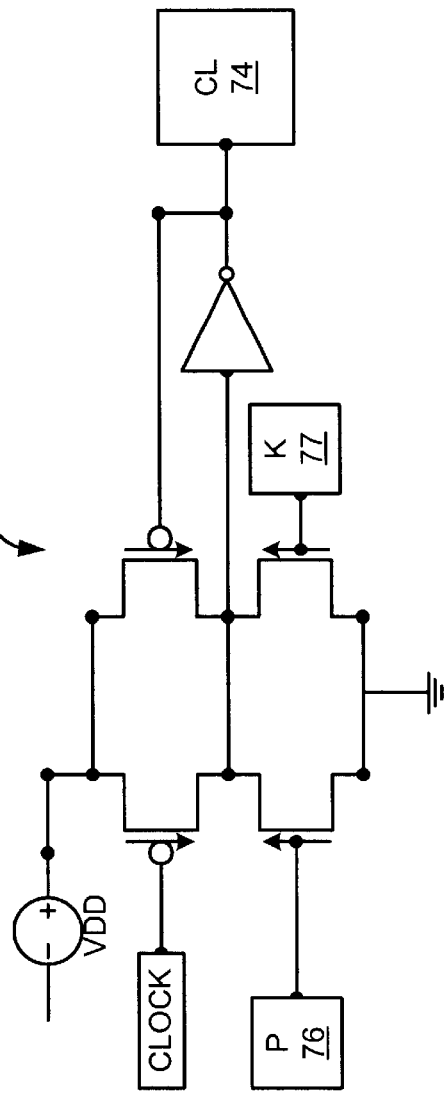
FIG. 8A
FIG. 8B

APPARATUS AND METHOD FOR REDUCING POWER AND NOISE THROUGH REDUCED SWITCHING RECORDING IN LOGIC DEVICES

BACKGROUND OF THE INVENTION

1. Technical Field

The present invention generally relates to radix 4 booth recoding, and more particularly, to reducing noise production and power consumption using reduced switching (i.e. radix 4 booth) recoding in traditional domino encoded logic circuits.

2. Description of Related Art

Currently, many arithmetic operations in present processor implementations are speed-up by utilizing a floating-point processor. These floating-point processors can include multipliers using radix multiplication and carry save adders to increase the performance of multiplication operations.

Generally, there are two popular stages of radix multiplication for carry save adders. High radix multiplication (radix 8 or greater) and low radix multiplication (radix 4 or lesser). High radix multiplication has the advantage of requiring fewer partial products to be generated and summed, however, high radix multiplication also requires that complex multiples of the X operand to be generated. Low radix multiplication (radix 4) is therefor a preferable implementation for executing multiplication due to the simple multiples of the X operand to be generated.

Illustrated in to FIG. 1A, is the radix 4 booth recoding multiplication table 2, the 3 multiplier bits and X operand multiples. As can be seen for radix 4 booth recoding multiplication, only the simple multiples of zero, 1X and 2X are required for the operand. As it is known in the art, a multiple of a number can be easily generated for the zero, one and two multiples. A zero multiple requires only that the value be reset, zeroed out or cleared out. A negative one multiple requires that the complement of the operand be obtained. A multiple of two for a number is easily generated for the number by performing a left shift by one position on the number. A negative multiple of two times a number is obtained by acquiring the complement of the multiple of two number.

Illustrated in FIG. 1B is a table 3 illustrating the traditional domino encoding method for operand multiples, that is normally implemented in radix 4 circuitry. As can be seen, traditional domino encoding requires that 2 of 5 wires be enabled to indicate the proper operand multiples: 0, +/−1X or +/−2X radix 4 output, as shown in the radix 4 multiplication table 2 (FIG. 1A). For power and noise reasons, it is desirable to reduce the number of wires routed over the carry save adder array and the switching activity of these wires.

Illustrated in FIG. 1C is a block diagram of a possible example of a multiplexer circuit 14 that utilizes a traditional domino encoding technique illustrated in FIG. 1B to output a final product. The circuit 11 is comprised of 0 times the multiplier 12, 1 times the multiplier 13, and 2 times the multiplier 14 signals. All these signals (12–14) are utilized as input into the 3:1 MUX 15. The 3:1 MUX 15 accepts the three multipliers 12, 13 and 14 signals as input and has signal lines 16(A–C) to select the appropriate output.

Upon using the proper selection lines 6(A–C), the proper input signal 12, 13, or 14 is output of the 3:1 MUX 15 and input into the exclusive or "XOR" 18. The "XOR" 18 accepts the correct multiplier signal from the 3:1 MUX 15, and a sign signal 17 to output the appropriate output on line 19. A schematic of the radix 4 booth encoded multiplexer 15 is herein defined in further detail with regard to FIG. 1D.

Illustrated in FIG. 1D is a schematic of the radix 4 booth encoded multiplexer 15 with 2 of 5 encoding, as shown in FIG. 1C. As shown in FIG. ID, the radix 4 booth multiplexer with 2 of 5 encoding of the prior art, requires 22 transistors for the circuit in 4 series of N-fets to generate the output. This 4 high N-fet stack can be slow and does require significant loading on the lines to preserve the correct values.

Illustrated in FIG. 1E is a table 21 illustrating a carry save adder array multiplier operation. Emphasized are the partial products generated during the multiplication operation. Portions of the partial products generated are considered non-critical drop-off bits 26. A non-critical partial product drop-off bit 26, is best described as a bit that is determined (i.e. fixed) very early in the cycle time of the overall logic device operation. Since this non-critical partial product drop-off bit 26 is determined very early in the cycle time of the overall device operation, it quite often must be carried a great distance and for a long period of time to be utilized in the final product.

For example, in a carry save adder array multiplier for large multiplicands and multipliers (i.e. 64 bit and larger), a great number of non-critical partial product bits can be produced. These large number of non-critical of partial product bits can cause wire routing problems during designed. Also, a large number of non-critical of partial product bits 26 can cause data errors due to the switching activity of the large number of wires. As discussed above, the non-critical partial product bits 26 can cause problems for circuit designers.

Therefore, it is desirable to reduce the number of wires routed and the switching activity of these non-critical partial product drop off bits wires over the carry save adder array multiplier and other traditional domino encoded logic devices.

Thus, a heretofore unaddressed need exists in the industry to address the aforementioned deficiencies and inadequacies.

SUMMARY OF THE INVENTION

The present invention provides an apparatus and method for reducing noise production and power consumption through reduced switching recoding (i.e. PKG encoding) of signals in traditional domino encoded logic devices.

Briefly described, in architecture, the apparatus can be implemented as follows. The apparatus includes a recode circuitry that receives and recodes a traditional domino encoded signal received from a first logic circuit in a logic device, into a reduced switching activity signal. The recode circuitry sends the reduced switching activity signal to a second logic circuit. A decode circuitry receives and decodes the reduced switching activity signal back into a traditional domino encoded signal. The decode circuitry then sends the traditional domino encoded signal to a second logic circuit in the logic device.

The present invention can also be viewed as providing method for reducing noise production and power consumption through reduced switching recoding (i.e. PKG encoding) of signals in traditional domino encoded logic devices.

In this regard, the method can be broadly summarized by the following steps: (1) receiving a traditional domino encoded signal from a first logic circuit; (2) converting the traditional domino encoded signal into a reduced switching activity signal; (3) transmitting the reduced switching activity signal; (4) receiving said reduced switching activity signal; and (5) converting the reduced switching activity signal back into a traditional domino encoded signal.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWING

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5A is a table illustrating the encoding of the present invention with regard to PKG recoding.

FIG. 5B is a block diagram illustrating a mousetrap logic encoding circuit for P-propagate code in a PKG recoding.

FIG. 5C is a block diagram illustrating a mousetrap logic encoding circuit for K-kill code in a PKG recoding.

FIG. 5D is a block diagram illustrating a mousetrap logic encoding circuit for the G-generate code in a PKG recoding.

FIG. 6A is a schematic of a possible example of a PKG recoder circuit for generating the P-propogate term of the present invention.

FIG. 6B is a schematic of a possible example of the PKG recoder circuit for generating the G-generate and K-kill terms of the present invention.

FIG. 8A is a schematic of a possible example of a decoder circuit of the present invention, for generating a sum low signal from PKG encoded signals.

FIG. 8B is a schematic of a possible example of a decoder circuit of the present invention, for generating a carry high signal from PKG encoded signals.

DETAILED DESCRIPTION OF THE PREFERRED EMBODIMENT

Figures 1A, 1B, 1C:
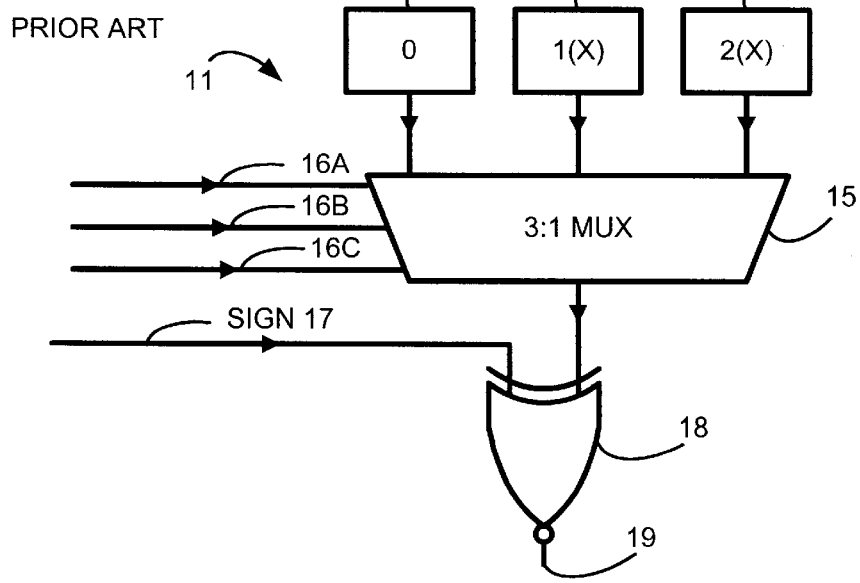
FIG. 1A is a multiplication table for radix 4 booth encoding including three multiplier bits and the operand multiplier.
FIG. 1B is a table illustrating the traditional domino encoding for radix 4 partial products multiplexer.
FIG. 1C is a block diagram illustrating a radix 4 booth multiplexer with 2 of 5 encoding with the traditional domino encoding method as shown in FIG. 1B.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figures 2, 3A:
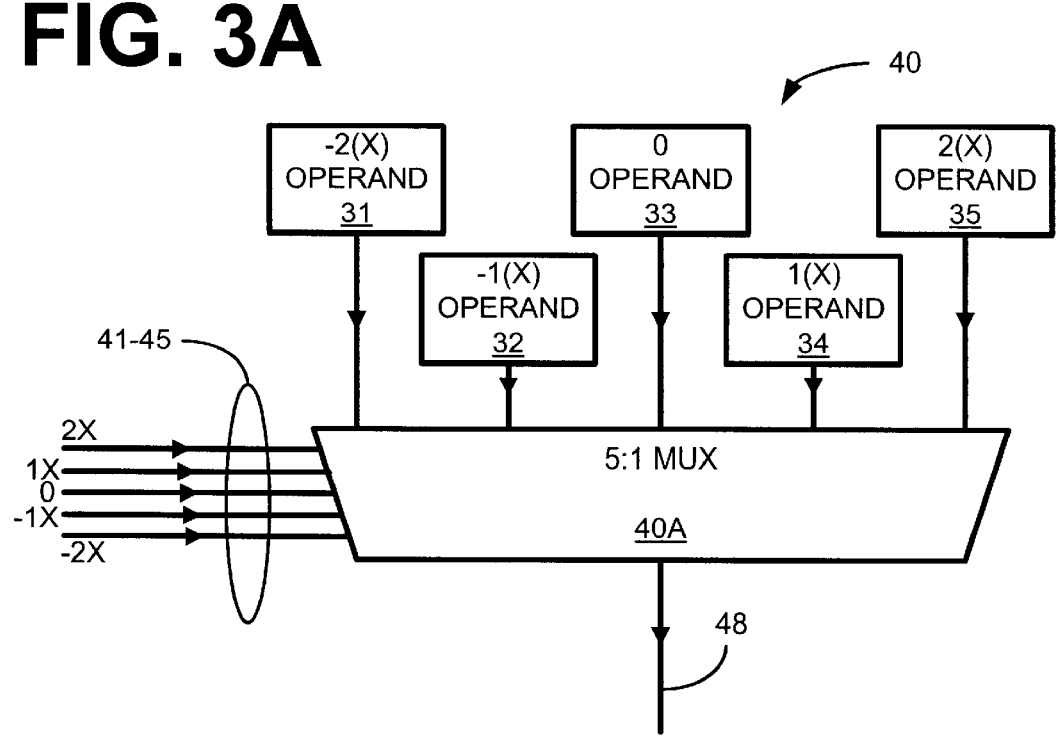
FIG. 2 is a table illustrating a new encoding method for a booth encoder multiplexer of the present invention that reduces switching activity of lines by 50% over traditional domino encoding.
FIG. 3A is a block diagram illustrating a multiplexer that processes the signals generated by utilizing the new encoding method of the present invention.

Illustrated in FIG. 2 is a table 30 illustrating the reduced switching recoding method of the present invention. The reduced switching recoding method of the present invention reduces switching activity of signal lines, by 50% over the traditional domino encoding method of the prior art. In comparing the reduced switching recoding method table 30 with the traditional domino encoding table 3 (FIG. 1B), it is evident that each of the five operand multiples for radix 4 output, can be represented by a single wire utilizing the reduced switching recoding method of the present invention.

While the traditional domino encoding method of the prior art requires a signal line to indicate a positive or negative sign and one signal to indicate the operand multiple. In utilizing the reduced switching recoding method of the present invention, switching activity is reduced by half, along with providing a significant power savings. Also, by reducing the switching activity of heavily loaded selection lines by 50%, the reduced switching recoding method of the present invention also reduces noise.

Illustrated in FIG. 3A is a block diagram of a possible example of a multiplexer 40 that processes the signals generated by utilizing the reduced switching recoding method of the present invention. As seen in FIG. 3A, the resulting multiplexer 40A is greatly simplified from the prior art multiplexer 15 (FIG. 1C) using traditional domino encoding representation. One example of a schematic circuit for the simplified multiplexer 40A is herein defined in further detail with regard to FIG. 3B.

Figure 1D:
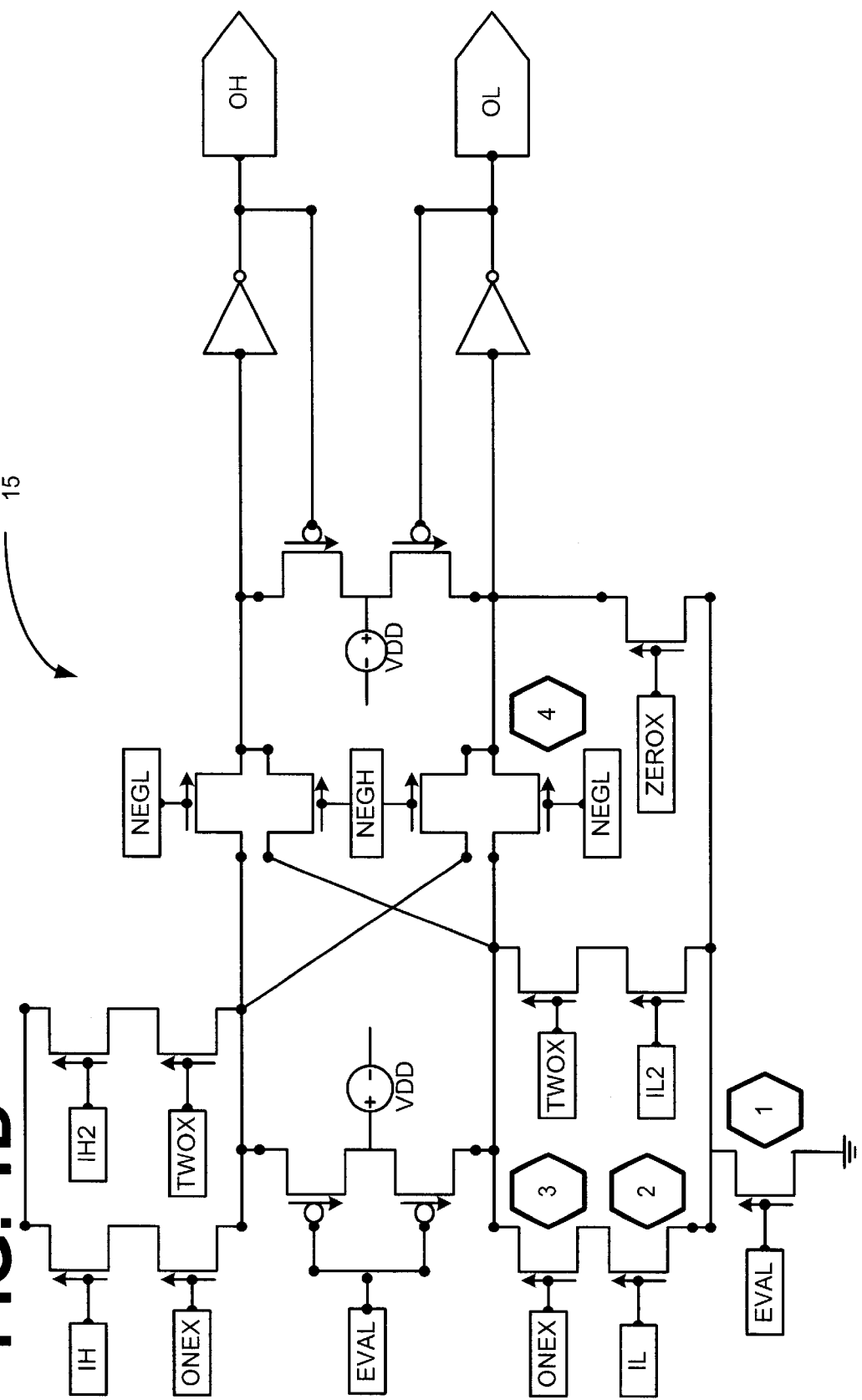
FIG. 1D is a schematic of an example of a radix 4 booth multiplexer, as shown in FIG. 1C, using the 2 of 5 encoding as shown in FIG. 1B.
Figure 3B:
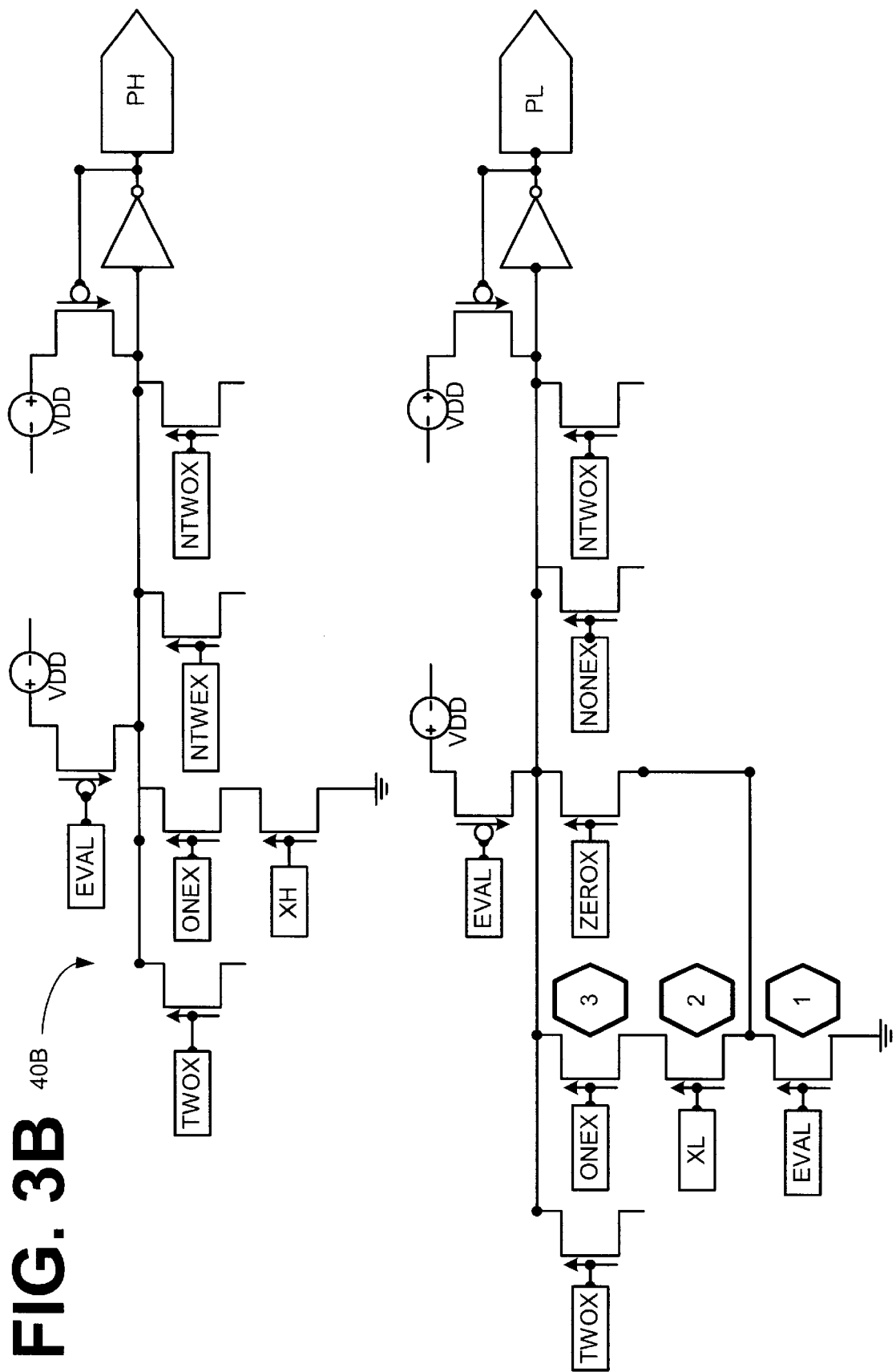
FIG. 3B is a schematic of a possible example of the radix 4 booth encoded multiplexer of the present invention, as shown in FIG. 3A.

Illustrated in FIG. 3B is a schematic of a possible example of the radix 4 booth encoded multiplexer 40B of the present invention. The radix 4 booth multiplexer 40B of the present invention has a comparable number of transistors as the radix 4 booth multiplexer 15 (FIG. 1D) with 2 of 5 encoding. However, the significant enhancement to the radix 4 booth multiplexer 40B of the present invention, is that there are at a maximum only 3 transistors in series. The reduction of the number of transistors in series by 25%, lowers the capacitance for the circuit by the same 25%. This incurs less load per input and output wire.

Figure 1E:
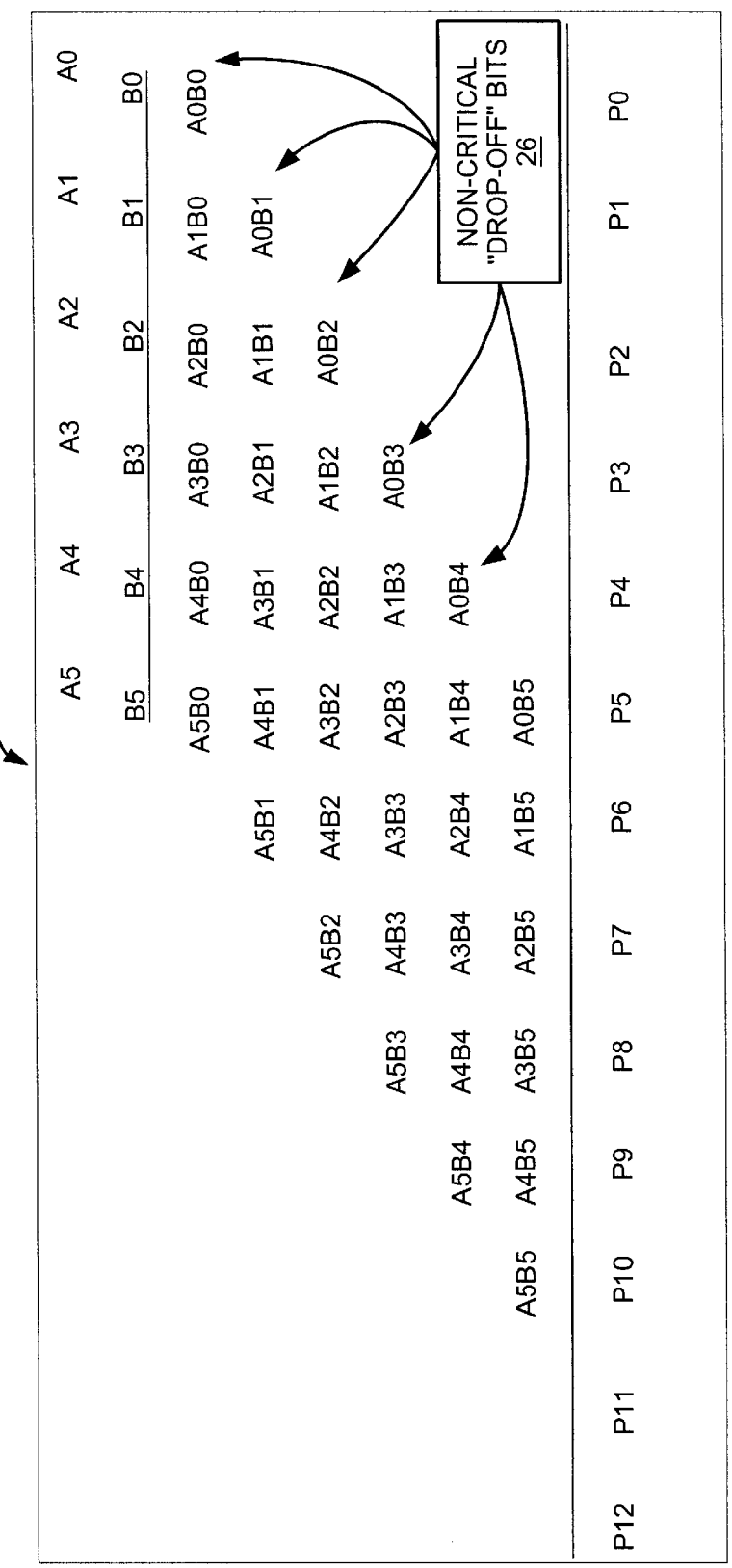
FIG. 1E is a table illustrating an example of a prior art carry save adder array multiplier operation generating non-critical drop-off bits.
Figure 4:
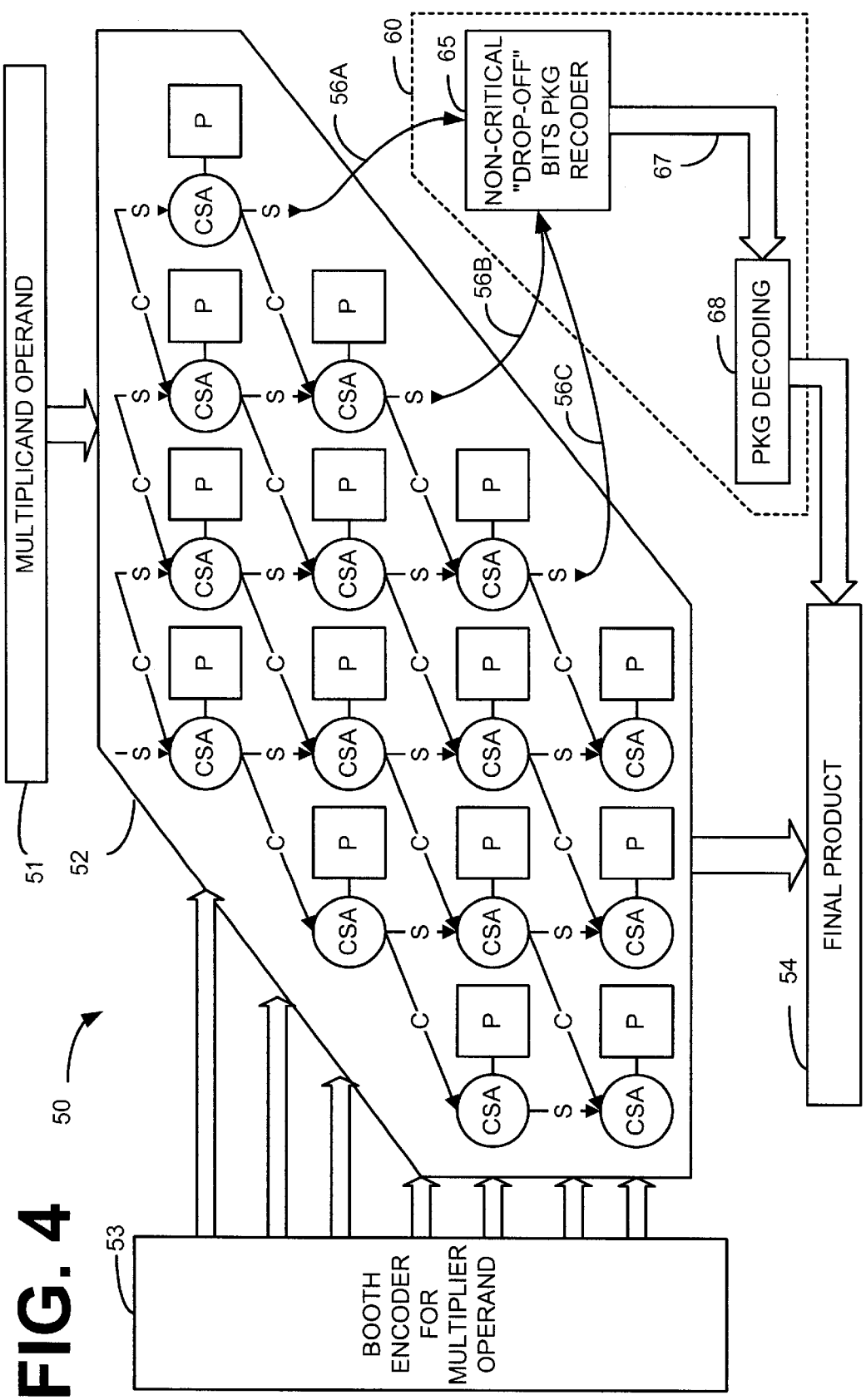
FIG. 4 is a block diagram illustrating the operation of a carry save adder array multiplier utilizing the new encoding method of the present invention.

Illustrated in FIG. 4 is an example of a carry save adder multiplier 50, including the reduced switching recoding method of the present invention. The example shown in this block diagram uses a PKG recoding circuit 60 to recode non-critical drop off bits, to illustrate another application of the reduced switching recoding method of the present invention. The carry save adder multiplier 50 operates in much the same manner as the carry save adder multiplier operation described above with regard to FIG. 1E.

Input into the carry save adder multiplier 50, is the traditional domino encoding multiplicand operand 51. Also input into the carry save adder array multiplier 50 is a multiplier operand 53 that is booth encoded prior to input. In these operands 51 and 53, are utilized by the carry save adder array logic 52 to generate the final product 54. Also shown, are the non-critical partial product bits 56(A–C) described above with regard to FIG. 1E. As discussed above, the non-critical partial product bits 56(A–C) can cause problems for circuit designers. However, the PKG recoding of the non-critical partial product bits 56(A–C) can solve many problems confronting circuit designers.

The PKG recoding circuit 60 of the present invention, operates by having the non-critical partial product drop off bits 56(A–C), input into a PKG recoder 65. The PKG recoder 65 recodes the traditional domino encoded numbers into PKG recoded values as discussed herein with regard to FIGS. 5(A–D).

These PKG recoded values are sent over link 67 to a possible PKG decoder 68. The PKG decoder 68 decodes the PKG recoded values into traditional domino encoded numbers as discussed herein with regard to FIGS. 7(A–D). The PKG decoder 68 decodes the PKG recoded values back into traditional domino encoded numbers for further operation in the carry save adder array multiplier 50.

Using the reduced switching activity encoded apparatus and method of the present invention (i.e. PKG recoding), on the non-critical partial product bits 56(A–C), can reduce the number of wires must be routed across the carry save adder array multiplier 50 and reduce switching activities of these reduced number of wires.

Illustrated in FIG. 5A is a recoding table 70 illustrating the reduced switching activity encoding of the present invention, with regard to PKG recoding. The example PKG recoding table 70, illustrates the reducing of wiring output of a logic device by recoding the traditional domino encoded sum and carry output signals, from the logic device, as PKG recoded signals P 76, K 77 and G 78. As one can see from PKG recoding table 70, the PKG recoding can represent any combination of the sum and carry signal bits with one active signal.

Illustrated in FIG. 5B is a block diagram of a possible example of a mousetrap logic encoding circuit 80, for propagate code P 76 in a PKG recoding. As shown in FIG. 4B, the propagate code is generated from the mousetrap encoding by taking the logical "AND" operation of sum high 71 and carry low 74 encoded signals in the "AND" logic 81 and the output is then entered into a first input of the OR logic 83. The logical "AND" of the sum low 72 and the carry high 73 is performed in the "AND" gate 82, and the output is then entered into a second input of the "OR" logic 83. The final logical operation utilizing the "OR" logic 83 produces the propagate code P 76 that is equal to the logical "AND" of the sum high 71 & carry low 74, or the logical "AND" of the sum low 72 & carry high 73 signals.

Illustrated in FIG. 5C is a block diagram of a possible example of a mousetrap logic encoding circuit 90, for kill code K 77 in PKG recoding. The kill or clear all bits code in the PKG recoding is represented by a logical "AND" of the sum low and carry low mousetrap encoding bits. If both the sum low and carry low bits are enabled, the PKG recoding generates the kill code K 77, which clears all logic.

Illustrated in FIG. 5D is a block diagram of a possible example of a mousetrap logic encoding circuit 100, for the generate code G 78 in PKG recoding. The generate code in PKG recoding is constructed utilizing a logical "AND" of the sum high and carry high bits in mousetrap encoding. If the sum high and carry high bits are enabled, the PKG recoding will generate the generate code G 78 that indicates the setting of both bits.

Illustrated in FIG. 6A is a possible schematic 80B of the example of a P recoder circuit 80A, as shown in FIG. 5B. The schematic of the example of a P recoder circuit 80B, of the present invention, is for generating the P-propogate term 76.

Illustrated in FIG. 6B is a possible schematic of the example of the K&G recoder circuits 90A and 100A respectively, as shown in FIGS. 5C and 5D. The schematics of the example of a K&G recoder circuits 90B and 100B respectively, are for generating the G-generate 78 and K-kill 77 terms of the present invention.

Figure 7A:
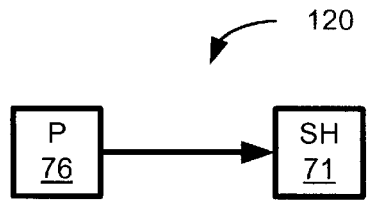
FIG. 7A is a block diagram illustrating the mousetrap logic decoded equivalent of a P-propagate code, which is equivalent to the sum high signal.

Illustrated in FIG. 7A is a block diagram illustrating the mousetrap logic decoded equivalent of a P-propagate code 76. The sum high signal 71 is depicted as the decoded mousetrap logic equivalent of the P-propagate code 76.

Figure 7B:
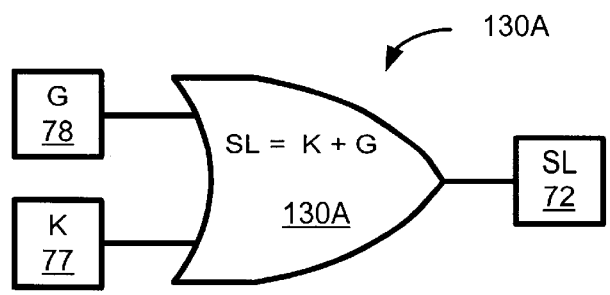
FIG. 7B is a block diagram illustrating a decoder circuit for decoding a sum low signal in mousetrap logic from a PKG encoded signals.

Illustrated in FIG. 7B is a block diagram illustrating a possible example of a decoder circuit 130A for a sum low signal 72 in mousetrap logic encoding. The sum low signal 72 is derived from PKG recoding kill code K 77 and G-generate code 78 signals. The sum low signal 72 is generated by a logical "OR" of the kill code K 77 and G-generate code 78 PKG recoding signals. If either the kill code K 77 or the G-generate code 78 are enabled, the decoder circuit 130A enables the sum low signal 72.

Figure 7C:
FIG. 7C is a block diagram illustrating the mousetrap logic decoded equivalent of a G-generate code, which is equivalent to the carry high signal.

Illustrated in FIG. 7C is a block diagram illustrating the mousetrap logic decoded equivalent of a G-generate code 78. The carry high signal 73 is depicted as the decoded mousetrap logic equivalent of the G-generate code 78.

Figure 7D:
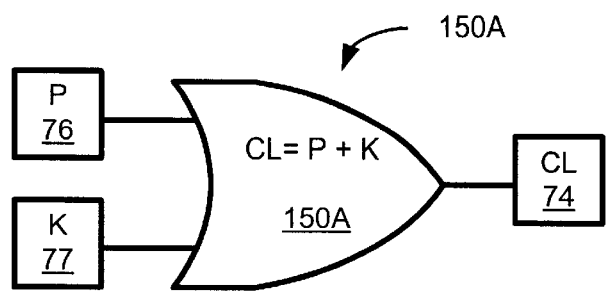
FIG. 7D is a block diagram illustrating a decoder circuit for decoding a carry low signal in mousetrap logic from a PKG encoded signals.

Illustrated in FIG. 7D is a block diagram illustrating a possible example of a decoder circuit 150A for a for a carry low signal 74 in mousetrap logic encoding. The carry low signal 74 is derived from PKG recoding propagate code 76 and kill code K 77 signals. The carry low signal 74 is generated by a logical "OR" of the propagate code 76 and kill code K 77 PKG recoding signals. If either the propagate code 76 or the kill code K 77 are enabled, the decoder circuit 150A enables the carry low signal 74.

Illustrated in FIG. 8A is a schematic of a possible example of a decoder circuit 130B, as shown in FIG. 7B, for generating a sum low signal 72 from PKG encoded signals.

Illustrated in FIG. 8B is a schematic of a possible example of a decoder circuit 150B, as shown in FIG. 7D, for generating a carry high signal 74 from PKG encoded signals.

While the decoded equivalents of the reduced switching activity signals (i.e. PKG recoding) are shown in FIGS. 7(A–D) and 8(A&B), it is contemplated by the inventors that logical operations may be performed on the reduced switching activity signals directly. Since decoding of the reduced switching activity signals is accomplished through such simple logic circuits, a designer may wish to perform logical operations directly with the reduced switching activity signals (i.e. PKG recoding).

Certainly a designer of ordinary skill in the art could produce a gating cell similar to the one shown in FIGS. 5(B–D)–8(A&B) to implement the PKG recoder and decoder of the present invention. The block diagrams of FIGS. 5(B–D)–8(A&B) show the architecture, functionality, and operation of a possible implementation of the system architecture to increase the performance of carry save adder multiplication operations. In this regard, each block represents a module, device, or logic. It should also be noted that in some alternative implementations, the functions noted in the blocks might occur out of the order. For example, two blocks may in fact be executed substantially concurrently, depending upon the functionality involved.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. An apparatus for reducing the number of signal paths required to send a traditional domino encoded signal between at least two logic circuits in a logic device that uses traditional domino encoded signals, said apparatus comprising:

a recode circuitry recodes at least one traditional domino encoded signal, received from a first logic circuit in said logic device, into a reduced switching signal, and said recode circuitry configured to transmit said reduced switching signal; and a decode circuitry receives and decodes said reduced switching signal back into said at least one traditional domino encoded signal, wherein said decode circuitry is configured to send said at least one traditional domino encoded signal to a second logic circuit.

2. The apparatus of claim 1, further comprising:

a transmission link for transmission of said reduced switching signal between said recode circuitry and said decode circuitry.

3. The apparatus of claim 2, wherein said reduced switching signal is a PKG signal.

4. The apparatus of claim 3, wherein said logic device is a carry save adder array multiplier.

5. The apparatus of claim 4, wherein said at least one traditional domino encoded signal is a non-critical drop-off bit.

6. The apparatus of claim 1, wherein said decode circuitry further comprises at least one logic circuit to perform a logic operation with said reduced switching signal.

7. The apparatus of claim 1, wherein said logic device is a booth encoded multiplexer.

8. A method for reducing the number of signals paths required to send a traditional domino encoded signal between at least two logic circuits in a logic device that uses traditional domino encoded signals, comprising the steps of:

receiving a traditional domino encoded signal from a first logic circuit;

converting said traditional domino encoded signal into a reduced switching signal;

transmitting said reduced switching signal; and converting said reduced switching signal back into said traditional domino encoded signal.

9. The method of claim 8, wherein said reduced switching signal is a PKG signal.

10. The method of claim 9, wherein said logic device is a carry save adder array multiplier.

11. The method of claim 10, wherein said traditional domino encoded signal is a non-critical drop-off bit.

12. An apparatus for reducing the number of signals paths required to send a traditional domino encoded signal between at least two logic circuits in a logic device that uses traditional domino encoded signals, said apparatus comprising:

means for receiving a traditional domino encoded signal from a first logic circuit;

means for converting said traditional domino encoded signal into a reduced switching signal;

means for transmitting said reduced switching signal;

means for receiving said reduced switching signal; and means for converting said reduced switching signal back into said traditional domino encoded signal.

13. The apparatus of claim 12, wherein said reduced switching signal is a PKG signal.

14. The apparatus of claim 13, wherein said logic device is a carry save adder array multiplier.

15. The apparatus of claim 14, wherein said traditional domino encoded signal is a non-critical drop-off bit.

* * * * *

UNITED STATES PATENT AND TRADEMARK OFFICE
CERTIFICATE OF CORRECTION

PATENT NO. : 6,285,300 B1  Page 1 of 1
DATED : September 4, 2001
INVENTOR(S) : Colon-Bonet It is certified that error appears in the above-identified patent and that said Letters Patent is hereby corrected as shown below:

Title page, Item [54] and Column 1, line 3,
Title, delete "RECORDING" and insert therefor -- RECODING --

Column 1,
Line 16, delete "speed-up" and insert therefor -- sped-up --
Line 27, delete "therefor" and insert -- therefore --
Line 30, after "in" delete "to"

Column 2,
Line 17, after "26" delete ","
Line 28, delete "designed" and insert therefor -- design --
Line 60, after "providing" insert -- a --

Column 4,
Line 28, after "lines" delete ","
Line 60, after "invention" delete ","

Signed and Sealed this

Thirtieth Day of September, 2003

JAMES E. ROGAN
*Director of the United States Patent and Trademark Office*